United States Patent
Salter et al.

(10) Patent No.: US 11,295,091 B2
(45) Date of Patent: Apr. 5, 2022

(54) SYSTEMS AND METHOD FOR INTENT MESSAGING

(71) Applicant: LIVEPERSON, INC., New York, NY (US)

(72) Inventors: Jeffrey Salter, Marietta, GA (US); Avi Kedmi, New York, NY (US)

(73) Assignee: LIVEPERSON, INC., New York, NY (US)

( * ) Notice: Subject to any disclaimer, the term of this patent is extended or adjusted under 35 U.S.C. 154(b) by 0 days.

(21) Appl. No.: 17/336,677

(22) Filed: Jun. 2, 2021

(65) Prior Publication Data

US 2021/0374355 A1 Dec. 2, 2021

Related U.S. Application Data

(60) Provisional application No. 63/033,529, filed on Jun. 2, 2020.

(51) Int. Cl.
*G06F 40/35* (2020.01)
*G06N 20/00* (2019.01)
*G06F 16/9032* (2019.01)
*G06Q 30/00* (2012.01)

(52) U.S. Cl.
CPC ........ *G06F 40/35* (2020.01); *G06F 16/90332* (2019.01); *G06N 20/00* (2019.01); *G06Q 30/016* (2013.01)

(58) Field of Classification Search
CPC ............. G06F 16/3329; G06F 16/3344; G06F 16/90332; G06F 40/35; G06N 20/00; G06Q 30/016; G10L 15/22
See application file for complete search history.

(56) References Cited

U.S. PATENT DOCUMENTS

| | | | |
|---|---|---|---|
| 9,641,690 B2* | 5/2017 | Ananthakrishnan | ......................... H04M 7/0027 |
| 9,785,715 B1* | 10/2017 | Busey | ....................... G06N 5/02 |
| 10,102,851 B1* | 10/2018 | Kiss | ..................... G10L 15/1822 |
| 10,608,966 B1* | 3/2020 | Landowski | ............ G06F 40/295 |
| 10,692,006 B1* | 6/2020 | Zhang | ..................... G06N 20/00 |
| 2002/0138456 A1* | 9/2002 | Levy | ........................ G06Q 30/02 706/25 |
| 2003/0144895 A1* | 7/2003 | Aksu | ........................ G09B 7/00 705/7.14 |

(Continued)

OTHER PUBLICATIONS

International Search Report and Written Opinion dated Sep. 10, 2021 for PCT Application No. PCT/US2021/035380, 17 pages.

*Primary Examiner* — Eric Yen
(74) *Attorney, Agent, or Firm* — Polsinelli LLP

(57) ABSTRACT

Disclosed embodiments provide a framework to assist customers in obtaining relevant responses from brands and other users to the intents communicated by these customers. In response to obtaining an intent, an intent messaging service identifies one or more users that can be provided with the intent to solicit responses to the intent. The one or more users are selected based on characteristics of the intent. The intent messaging service evaluates the responses to the intent from the one or more users to identify relevant responses that can be presented to the customer. The intent messaging service provides the relevant responses to the intent to the customer, which can determine which users to interact with to address the intent.

24 Claims, 10 Drawing Sheets

(56) References Cited

U.S. PATENT DOCUMENTS

| | | | |
|---|---|---|---|
| 2006/0155513 A1* | 7/2006 | Mizrahi | G06Q 30/02 |
| | | | 702/179 |
| 2008/0104037 A1* | 5/2008 | Bierner | G06F 16/3322 |
| 2010/0205199 A1* | 8/2010 | Lin | G06F 16/9535 |
| | | | 707/765 |
| 2013/0325645 A1 | 12/2013 | Thomas | |
| 2014/0188835 A1* | 7/2014 | Zhang | G06F 16/951 |
| | | | 707/706 |
| 2014/0214818 A1* | 7/2014 | Du | G06Q 10/101 |
| | | | 707/723 |
| 2014/0270145 A1 | 9/2014 | Erhart et al. | |
| 2014/0280092 A1* | 9/2014 | Marantz | G06F 16/90324 |
| | | | 707/723 |
| 2016/0071517 A1* | 3/2016 | Beaver | G10L 15/22 |
| | | | 704/9 |
| 2016/0285790 A1 | 9/2016 | Szeto et al. | |
| 2018/0144046 A1* | 5/2018 | Braga | G06F 16/3329 |
| 2019/0182383 A1* | 6/2019 | Shaev | H04M 3/527 |
| 2019/0199658 A1 | 6/2019 | Kim et al. | |
| 2019/0347297 A1 | 11/2019 | Galitsky | |
| 2019/0392926 A1* | 12/2019 | Koh | G10L 15/08 |
| 2020/0089698 A1* | 3/2020 | Braga | G06K 9/6253 |
| 2020/0120185 A1* | 4/2020 | Salter | G06F 16/90335 |
| 2020/0159861 A1* | 5/2020 | Baeck | G06F 16/248 |
| 2021/0120206 A1* | 4/2021 | Liu | G06F 3/011 |

* cited by examiner

SYSTEMS AND METHOD FOR INTENT MESSAGING

CROSS-REFERENCE TO RELATED APPLICATIONS

The present patent application claims the priority benefit of U.S. provisional patent application No. 63/033,529 filed Jun. 2, 2020, the disclosures of which are incorporated by reference herein.

FIELD

The present disclosure relates generally to systems and methods for facilitating messaging between customers and brands. More specifically, techniques are provided to deploy a framework to assist customers in obtaining relevant responses from brands and other users to the intents communicated by these customers.

SUMMARY

Disclosed embodiments provide a framework for an intent processing system that allows customers to interact with brands and other users to obtain relevant responses to their intents. According to some embodiments, a computer-implemented method is provided. The computer-implemented method comprises obtaining an intent. The intent corresponds to a request that is to be addressed. Further, the intent is associated with a customer. The computer-implemented method further comprises identifying one or more users to which to provide the intent. The one or more users are identified based on a set of characteristics of the intent. The computer-implemented method further comprises providing the intent. The intent is provided to the one or more users to solicit responses to the intent. The computer-implemented method further comprises obtaining a set of responses to the intent. The computer-implemented method further comprises evaluating the set of responses to identify relevant responses to the intent. Irrelevant responses from the set of responses are discarded. The computer-implemented method further comprises providing the relevant responses to cause the relevant responses to be presented to the customer in response to the intent.

In an example, a system comprises one or more processors and memory including instructions that, as a result of being executed by the one or more processors, cause the system to perform the processes described herein. In another example, a non-transitory computer-readable storage medium stores thereon executable instructions that, as a result of being executed by one or more processors of a computer system, cause the computer system to perform the processes described herein.

This summary is not intended to identify key or essential features of the claimed subject matter, nor is it intended to be used in isolation to determine the scope of the claimed subject matter. The subject matter should be understood by reference to appropriate portions of the entire specification of this patent application, any or all drawings, and each claim.

The foregoing, together with other features and examples, will be described in more detail below in the following specification, claims, and accompanying drawings.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

The present disclosure is described in conjunction with the appended Figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred examples of embodiment(s) only and is not intended to limit the scope, applicability or configuration of the disclosure. Rather, the ensuing description of the preferred examples of embodiment(s) will provide those skilled in the art with an enabling description for implementing a preferred examples of embodiment. It is understood that various changes can be made in the function and arrangement of elements without departing from the spirit and scope as set forth in the appended claims.

Figure 1:
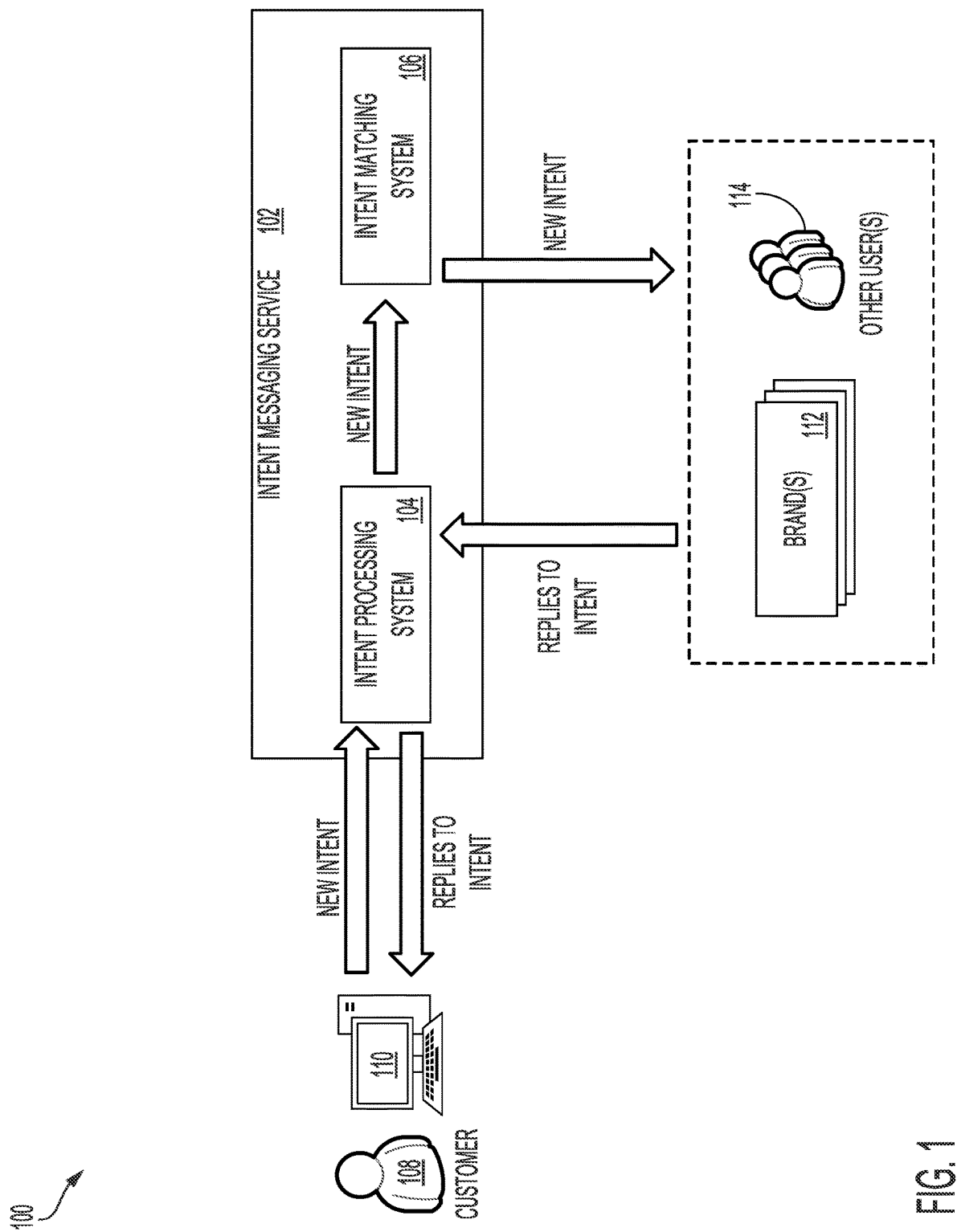
FIG. 1 shows an illustrative example of an environment in which an intent messaging service obtains an intent from a customer and presents the customer with responses to the intent from brands and other users in accordance with at least one embodiment.

FIG. 1 shows an illustrative example of an environment 100 in which an intent messaging service 102 obtains an intent from a customer 108 and presents the customer with responses to the intent from brands 112 and other users 114 in accordance with at least one embodiment. An intent may correspond to an issue that a customer wishes to have resolved. Examples of intents can include (for example) topic, sentiment, complexity, and urgency. A topic can include, but is not limited to, a subject, a product, a service, a technical issue, a use question, a complaint, a refund request or a purchase request, etc. An intent can be determined, for example, based on a semantic analysis of a message (e.g., by identifying keywords, sentence structures, repeated words, punctuation characters and/or non-article words); user input (e.g., having selected one or more categories); and/or message-associated statistics (e.g., typing speed and/or response latency).

In the environment 100, a customer 108, via an intent messaging application implemented on a computing device 110, transmits a request to an intent processing system 104 of an intent messaging service 102 to obtain one or more responses to the request from one or more brands 112 and/or other users 114 associated with the intent messaging service 102. The other users 114 may include members of the intent messaging service 102 community that may also interact with brands 112 to obtain responses to their intents and that may have experience with regard to various topics, goods, services, or other areas that may be associated with intents. The intent messaging application implemented on the computing device 110 may be provided by the intent messaging service 102 to allow customers, such as customer 108, to interact with brands 112 and other users 114 that are associated with the intent messaging service 102 (e.g., community of users that utilize the intent messaging service 102) and may provide goods and services to customers. The intent messaging service 102 may provide a platform for customers and brands to connect in order to provide recommendations and advice with regard to intents submitted by these customers.

In response to obtaining a request from a customer 108, the intent processing system 104 may evaluate the request to extract an intent expressed by the customer 108 and that may be used to identify the brands 112 and other users 114 that may provide relevant responses to the customer's request. In an embodiment, the intent processing system 104 utilizes a machine learning model to process the request in order to identify and extract the intent from the request. The machine learning model may be used to perform a semantic analysis of the request (e.g., by identifying keywords, sentence structures, repeated words, punctuation characters and/or non-article words) to identify the intent expressed in the request. The machine learning model utilized by the intent processing system 104 may be dynamically trained using supervised learning techniques. For instance, a dataset of input requests and known intents included in the input requests can be selected for training of the machine learning model. In some implementations, known intents used to train the machine learning model may include characteristics of these intents. The machine learning model may be evaluated to determine, based on the input sample requests supplied to the machine learning model, whether the machine learning model is extracting the expected intents from each of the requests. Based on this evaluation, the machine learning model may be modified to increase the likelihood of the machine learning model generating the desired results. The machine learning model may further be dynamically trained by soliciting feedback from customers, including customer 108, with regard to the extracted intent obtained from submitted requests. For instance, prior to submitting an extracted intent for identification of one or more brands 112 or other users 114 from which to solicit responses to the intent, the extracted intent may be presented to the customer 108 to determine whether the extracted intent corresponds to the request submitted by the customer 108. The response from the customer 108 may, thus, be utilized to train the machine learning model based on the accuracy of the machine learning model in identifying the intent from the request.

The intent processing system 104 may provide the extracted intent to an intent matching system 106 of the intent messaging service 102. The intent matching system 106 may be implemented on a computing system or other system (e.g., server, virtual machine instance, etc.) of the intent messaging service 102. Alternatively the intent matching system 106 may be implemented as an application or other process executed on a computing system of the intent messaging service 102. In an embodiment, in response to obtaining a new intent from the intent processing system 104, the intent matching system 106 utilizes the new intent, as well as information regarding different brands 112 and other users associated with the intent messaging service 102, as input to a machine learning model to identify one or more brands 112 and/or other users 114 that may be likely to provide relevant responses to the intent. The information regarding the different brands 112 and other users 114 may include historical data corresponding to responses submitted by the different brands 112 and other users 114 to previously provided intents. The historical data may indicate a brand's or other user's performance in providing relevant responses to different intents submitted to the brand or other user, information regarding any prior interactions between the brand/other user and the customer 108, customer feedback (if any) related to a customer's interaction with the brand or other user, and the like. Further, the information regarding a brand or other user may specify the types of intents that the brand or other user may have expertise in responding to. For instance, the information may indicate what goods and services are provided by a brand, what goods or services a user has utilized, or any other information that may be useful in identifying whether resolution of a particular intent may involve these goods and services.

The machine learning model utilized by the intent matching system 106 may be dynamically trained using sample intents and sample outputs corresponding to features of brands 112 and other users 114 that may be used to identify the brands 112 and other users 114 to which an intent is to be provided. Further, the machine learning model may be dynamically trained using feedback from the different brands 112 and other users 114 receiving an intent. This feedback may be used to determine whether the machine learning model is selecting brands 112 and other users 114 that are capable of responding to an intent with a relevant response or that are otherwise associated with a feature of an intent. This feedback may be used to further train the machine learning model utilized by the intent matching system 106. Thus, the machine learning model may be dynamically trained in real time as feedback is obtained by the intent matching system 106 from different brands 112 and other users 114 for myriad intents submitted to these different brands 112 and other users 114. Alternatively, the machine learning model may be trained periodically based on obtained feedback from the brands 112 and other users 114.

The output of the machine learning model utilized by the intent matching system 106 may include identifiers corresponding to the one or more brands 112 and/or other users 114 to which the new intent is to be provided in order to solicit responses from each of the one or more brands 112 and/or other users 114. The new intent may be assigned a unique identifier such that responses obtained from the one or more brands 112 and/or other users 114 may be associated with the particular intent by reference to the unique identifier. In an embodiment, the intent matching system 106 updates the user interface of the intent messaging application utilized by each brand 112 or other user 114 to indicate solicitation of a response to a particular intent. For instance, through this user interface, the intent matching system 106 may present an agent associated with the brand 112 or other user 114 with the new intent, as well as options for responding to the intent. An agent associated with the brand 112 or other user 114, via this user interface, may respond to the intent, reject/ignore the intent, or provide an indication to the intent matching system 106 that the intent is not relevant to the brand 112 or other user. The action performed by the agent associated with the brand 112 or other user 114 may be used to further dynamically train the machine learning model utilized by the intent matching system 106 to select brands 112 and other users for responding to intents. For instance, if an agent associated with a brand indicates that a provided intent is not relevant to the brand, the intent matching system may utilize this feedback to train the machine learning model such that irrelevant intents are not provided to the brand.

In an embodiment, a brand 112 (e.g., an agent associated with the brand that is assigned to interact with the intent messaging service 102) or other user 114 receiving an intent is restricted to a single response to the intent. For instance, when an agent associated with a brand 112 or other user 114 submits a response to an intent to the intent processing system 104, the intent messaging application utilized by the agent associated with the brand 112 or other user 114 may disable the ability to submit additional responses to the intent until the customer 108 has indicated that it wishes to engage further with the brand 112 or other user 114 with regard to the intent. This may prevent a brand 112 or other user 114 from inundating (e.g., "spamming") the customer 108 with responses to the intent. Further, should a customer 108 refuse to engage with the brand 112 or other user 114, the customer 108 may be spared from additional responses from the brand 112 or other user 114.

If an agent associated with a brand 112 or other user 114 submits an intent response to the intent processing system 104 for the customer 108, the intent processing system 104 may evaluate the intent response to determine whether the intent response is relevant to the intent submitted by the customer 108. In an embodiment, the intent processing system 104 utilizes a classification algorithm or other machine learning model to classify an intent response as either being relevant to the intent or irrelevant to the intent. The classification algorithm or other machine learning model utilized by the intent processing system 104 may be dynamically trained using supervised learning techniques. For instance, a dataset of input intents, known relevant responses, known irrelevant responses, and classifications, can be selected for training of the classification algorithm or other machine learning model. In some examples, the input intents can be obtained from administrators of the intent messaging service, customers of the intent messaging service, or other sources associated with the intent messaging service. In some implementations, known relevant and irrelevant responses used to train the classification algorithm or other machine learning model utilized by the intent processing system include responses generated by the entities that generated the sample intents. Further, the classification algorithm or other machine learning model used to classify intent responses as being relevant or irrelevant may be trained using feedback from customers, including customer 108. For instance, if a response classified as being relevant to an intent is provided to a customer 108, the customer 108 may provide feedback indicating whether the response was indeed relevant to the intent. This feedback may be used to either reinforce the model (e.g., a response classified as being relevant was deemed relevant to the intent by the customer) or to update the model (e.g., a response classified as being relevant was deemed to be irrelevant to the intent by the customer). As customers of the intent messaging service 102 provide this feedback to the intent messaging service 102, the classification algorithm or other machine learning model may be dynamically updated in real time.

The intent processing system 104, using the classification algorithm or machine learning model described above, may discard any responses classified as being irrelevant to the intent. In an embodiment, if the intent processing system 104 determines that a brand 112 or other user has provided an irrelevant response to an intent, the intent processing system 104 updates the profile of the brand 112 or other user to indicate that it has provided an irrelevant response to the intent. This may reduce the likelihood of the brand 112 or other user 114 from being selected by the intent matching system 106 to respond to similar intents. In some instances, this feedback may also be used to dynamically train the machine learning model utilized by the intent matching system 106 to further reduce the likelihood of the brand 112 or other user 114 being solicited to provide responses to similar intents. If a brand 112 or other user 114 is deemed to be providing irrelevant responses on a consistent basis, other remedial operations may be performed, such as disassociating or removing the brand 112 or other user from the intent messaging service 102.

If the intent processing system 104 determines that a relevant response to an intent has been obtained, the intent processing system 104 may provide this response to the customer 108 via the intent messaging application operating on the computing device 110. This may cause the intent response to be displayed on a user interface of the computing device 110. Through this user interface, the customer 108 may evaluate the intent response and determine whether to engage further with the brand 112 or other user 114, thank or express gratitude to the brand 112 or other user for the response, or ignore the intent response. Additionally, the customer 108 may provide feedback to the intent processing system 104 with regard to the quality of the intent response. This feedback may be utilized to further dynamically train the machine learning model utilized by the intent matching system 106 used to identify brands 112 and other users 114 to which intents are provided to solicit responses to the intents.

In an embodiment, if the customer 108 determines that it wants to communicate with a brand 112 or other user 114 further with regard to the intent submitted by the customer 108, the intent messaging service 102 establishes a communications channel between the customer 108 and the brand 112 or other user 114 through which the customer 108 and brand 112 or other user 114 may exchange messages and other content. As noted above, when a brand 112 or other user 114 submits a response to an intent, the intent messaging application utilized by the brand 112 or other user may prohibit the brand 112 or other user 114 from submitting additional responses. However, if the customer 108 indicates that it wishes to converse with the brand 112 or other user 114 with regard to the intent, the intent messaging service 102 may transmit an instruction or other indication to the intent messaging application to enable the brand 112 or other user 114 to submit additional responses to the customer 108 vis the intent messaging application. Further, the intent messaging service 102 may provide the brand 112 or other user with additional information regarding the customer 108 (e.g., customer name, customer address, customer images, customer contact information, etc.).

Figure 2:
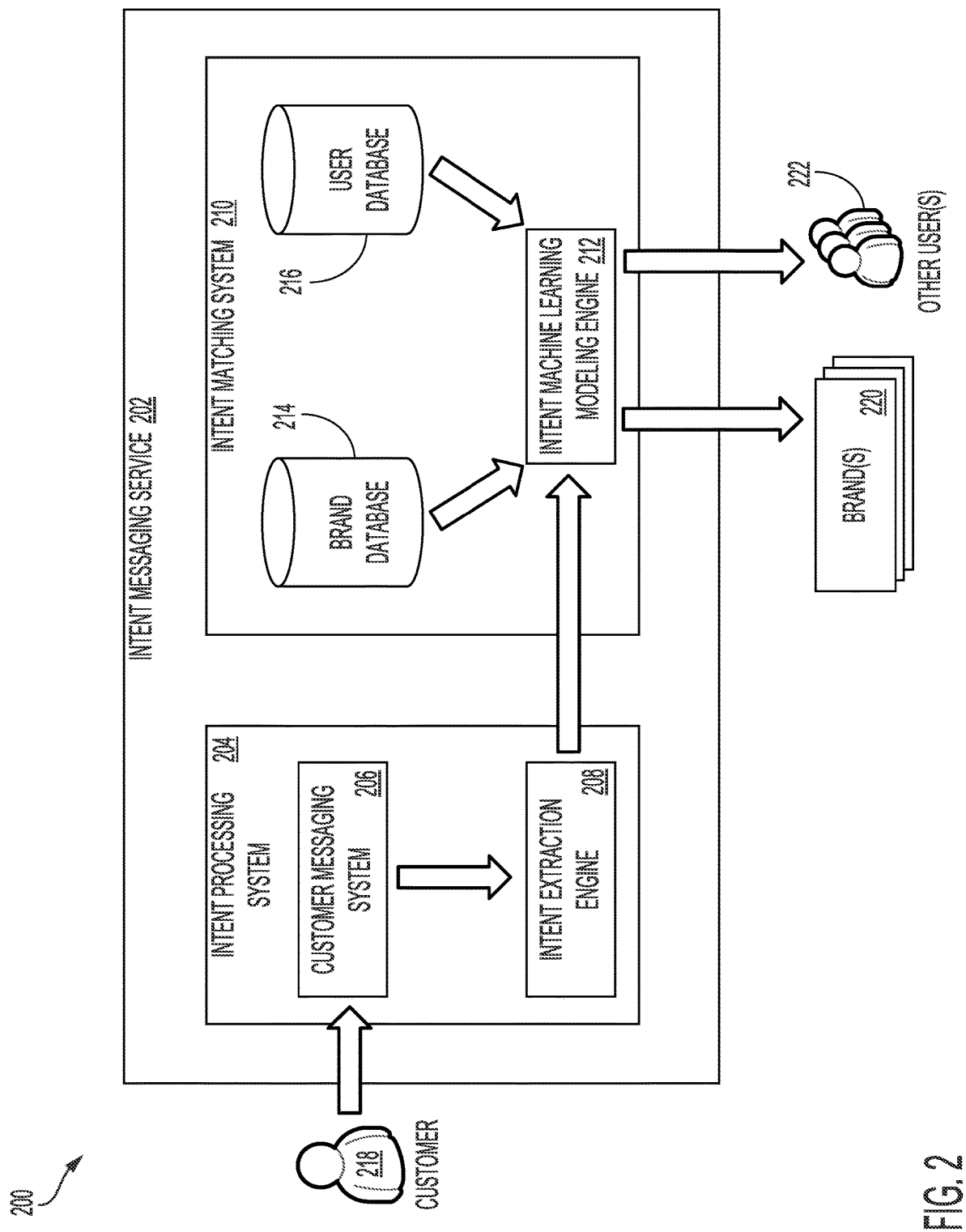
FIG. 2 shows an illustrative example of an environment in which an intent messaging service identifies brands and other users to solicit responses to an intent submitted by a customer in accordance with at least one embodiment.

FIG. 2 shows an illustrative example of an environment 200 in which an intent messaging service 202 identifies brands 220 and other users 222 to solicit responses to an intent submitted by a customer 218 in accordance with at least one embodiment. In the environment 200, the intent messaging service 202 obtains a request from a customer 218 to solicit responses from one or more brands 220 and/or other users 222 with regard to a particular intent. For instance, the customer 218, using an intent messaging application installed on a computing device utilized by the customer 218 or otherwise accessed by the customer 218 using the computing device (e.g., via a website, etc.), may generate the request and indicate, in the request, the intent for which the customer 218 is seeking relevant responses. The intent may (for example) be a topic, sentiment, complexity, and/or level of urgency. A topic can include, but is not limited to, a subject, a product, a service, a technical issue, a use question, a complaint, a refund request or a purchase request, etc.

The customer 218, via the intent messaging application, may transmit its request and corresponding intent to a customer messaging system 206 of an intent processing system 204. The customer messaging system 206 may be implemented on a computing system of the intent messaging service 202 or as an application executed by a computing system of the intent processing system 204. The customer messaging system 206 may facilitate communications between the customer 218 and the intent messaging service 202 and any brands 220 and/or other users 222 associated with the intent messaging service 202. For instance, the customer messaging system 206 may establish a communications channel with any brand 220 or other user 222 that the customer 218 has selected to engage in a conversation via the intent messaging application concerning a particular intent. Further, the customer messaging system 206 may serve to update the user interface of the intent messaging application based on the provided intent and responses obtained from the intent messaging service 202 identifying brands 220 and other users 222 from which intent responses may be solicited for the particular intent.

In response to obtaining the request and corresponding intent from the customer 218, the customer messaging system 206 may transmit the request and corresponding intent to the intent extraction engine 208 of the intent processing system 204 to extract the intent from the request. The intent extraction engine 208 may be implemented as a computer system that utilizes a machine learning model to process an incoming request from a customer 218 to identify the intent expressed in the request. For instance, the machine learning model may be used to perform a semantic analysis of the request (e.g., by identifying keywords, sentence structures, repeated words, punctuation characters and/or non-article words) to identify the intent expressed in the request. An intent can also be determined, for example, based on user input (e.g., having selected one or more categories); and/or message-associated statistics (e.g., typing speed and/or response latency).

The machine learning model utilized by the intent extraction engine 208 may be trained using supervised learning techniques. For instance, a dataset of input requests and known intents included in the input requests can be selected for training of the machine learning model implemented by the intent extraction engine 208. In some examples, the input requests can be obtained from administrators of the intent messaging service 202, customers of the intent messaging service 202, or other sources associated with the intent messaging service 202. In some implementations, known intents used to train the machine learning model utilized by the intent extraction engine 208 may include characteristics of these intents provided by the entities that generated the sample requests. The machine learning model may be evaluated to determine, based on the input sample requests supplied to the machine learning model, whether the machine learning model is extracting the expected intents from each of the requests. Based on this evaluation, the machine learning model may be modified (e.g., one or more parameters or variables may be updated) to increase the likelihood of the machine learning model generating the desired results (e.g., expected intents).

In an embodiment, the intent extraction engine 208 evaluates the request from the customer 208 to determine whether additional information is required in order to extract or otherwise supplement the intent from the request in order to allow for identification of brands 220 and/or other users 222 that may provide relevant responses to the intent. For instance, the intent extraction engine 208 may determine that the customer's geographic location and timeframe for resolution of the intent are required. The intent extraction engine 208 may transmit a request to the customer messaging system 206 to solicit this additional information from the customer 218. In an embodiment, the customer messaging system 206 utilizes natural language processing (NLP) or other artificial intelligence to solicit the customer 208 for the requested information. For example, using NLP or other artificial intelligence, the customer messaging system 206 may ask the customer 218 to provide its location, the timeframe for resolution of the intent, which users or brands the customer 218 would like to solicit responses from, and the like. Responses provided by the customer 218 may be provided to the intent extraction engine 208, which may use these responses and the supplied request from the customer 218 to extract the intent and supplement the intent with the additional information provided by the customer 218. This may be used by the intent matching system 210 to identify the brands 220 and/or other users 222 that may be solicited to obtain responses to the intent.

The intent extraction engine 208 may provide an extracted intent from the request submitted by the customer 218 to an intent machine learning modeling engine 212 of the intent matching system 210. The intent machine learning modeling engine 212 may be implemented on a computing system of the intent matching system 210 or otherwise as an application or process executed on a computing system of the intent matching system 210. In an embodiment, the intent machine learning modeling engine 212 implements a machine learning model configured to identify brands 220 and/or other users 222 to which an intent may be supplied in order to solicit responses to the intent. The machine learning model implemented by the intent machine learning modeling engine 212 may utilize a brand database 214 and user database 216 maintained by the intent matching system 210, as well as the customer's intent, as input to a machine learning model to identify the brands 220 and/or users 222 that are likely to provide relevant responses to the intent. The brand database 214 and user database 216 may include profiles of each of the brands 220 and users 222, respectively, which may be associated with the intent messaging service 202. Each profile may indicate a user's or brand's experience responding to particular intents or categories of intents, as well as the user's or brand's interest in the underlying topic or classification of the intent. Further, each profile may indicate feedback with regard to a user's or brand's response to previously provided intents. This feedback may specify whether a response provided for a particular intent was relevant, useful, or otherwise appreciated by the corresponding customer.

The user database 216 may further include a profile of the customer 218. The profile of the customer 218 may indicate any customer preferences for particular brands 220 or other users 222. For instance, the profile of the customer 218 may specify which brands 220 or other users 222 the customer 218 has interacted with to address previously supplied intents. Further, for each of these interactions, the profile may include feedback from the customer 218. This feedback may indicate whether interaction with a particular brand or other user was relevant to the corresponding intent, useful in addressing the corresponding intent, or otherwise conducive to a positive experience with the brand or other user. This information may also be utilized by the intent machine learning modeling engine 212 to identify which brands 220 and/or other users 222 to solicit in order to obtain a response to the intent.

The machine learning model utilized by the intent machine learning modeling engine 212 may be trained using sample intents and sample outputs corresponding to features of brands 220 and other users 222 that may be used to identify the brands 220 and other users 222 to which an intent is to be provided. Further, the machine learning model may be trained using feedback from the different brands 220 and other users 222 receiving an intent. This feedback may be used to determine whether the machine learning model is selecting brands 220 and other users 222 that are capable of responding to an intent with a relevant response or that are otherwise associated with a feature of an intent. For example, if a brand that provides interior design services obtained an intent that is not related to interior design, the brand may provide feedback indicating that the provided intent is not relevant to the brand. This feedback may be used to further train the machine learning model utilized by the intent machine learning modeling engine 212.

The output produced by the machine learning model implemented by the intent machine learning modeling engine 212 may include identifiers corresponding to the brands 220 and/or other users 222 to which the intent is to be provided in order to solicit responses from the brands 220 and/or other users 222. Based on this output, the intent machine learning modeling engine 212 may transmit the intent to the identified brands 220 and/or other users 222. For instance, the intent machine learning modeling engine 212 may update a user interface of an intent messaging application of each of the identified brands 220 and/or other users 222 to present the intent. The intent may be assigned a unique identifier such that responses from the brands 220 and/or other users 222 to the intent may be associated with the intent by the unique identifier. A brand or other user receiving the intent via the intent messaging application may respond to the intent and submit the response to the intent processing system 204, which may evaluate the response to determine whether the response is relevant to the intent.

In an embodiment, the intent is provided anonymously to the identified brands 220 and/or other users 222. For instance, the intent machine learning modeling engine 212 may remove any identifying information of the customer 218 (e.g., customer name, customer address, customer contact information, etc.) when supplying the intent to the identified brands 220 and/or other users 222. However, the intent machine learning modeling engine 212 may provide, in addition to the intent, other information that may be useful to the brand or other user in preparing a response to the intent. For instance, the intent may be provided with a general location of the customer 218 (e.g., city, state, etc.). This general location can be used to determine whether the brand or other user can provide a response to the intent that may be indicative of an ability to assist the customer 218 at the general location (e.g., brand may maintain a shop within the general location, a user provides goods and services at the general location, etc.).

In an embodiment, once a brand or other user submits a response to the intent, the intent messaging service 202 may disable the brand's or other user's ability to provide additional responses to the intent via the intent messaging application. This prevents brands or other users from potentially inundating the customer 218 with responses to a particular intent. A conversation with the customer 218, via the intent messaging application, may be established upon a request from the customer 218 to initiate a communications channel with the particular brand 220 or other user 222.

In an embodiment, the intent processing system 204, in response to obtaining an intent response from a brand or other user, utilizes a classification algorithm or other machine learning model to evaluate the intent response in order to classify the intent response as either being relevant to the intent or irrelevant to the intent. Any responses classified as being irrelevant to the intent may be discarded by the intent processing system 204. Responses that are classified as being relevant to the intent may be presented to the customer 218 by the customer messaging system 206 via the intent messaging application implemented on the customer's computing device. Further, the intent response may be provided with options for the customer 218 to invite the brand or other user that submitted the intent response to a conversation with regard to the intent, to thank the brand or other user for their intent response, to ignore the intent response from the brand or other user, to ignore future responses from the brand or other user (e.g., block the brand or other user), and the like. If the customer 218 opts to converse with the brand or other user based on the provided intent response, the customer messaging system 206 may establish a communications channel between the customer 218 and the brand or other user to allow for the customer 218 and the brand or other user to converse using their respect intent messaging applications. In an embodiment, the customer messaging system 206 provides, to the brand or other user, customer information (e.g., name, images, address, contact information, etc.) upon establishing the communications channel. Further, the customer messaging system 206 re-enables the brand or other user to transmit messages or responses to the customer 218 over the newly established communications channel.

Responses to an intent from the brands 220 and/or other users 222 may be evaluated by the intent processing system 204 to determine their relevance to the intent of the customer 218.

Figure 3:
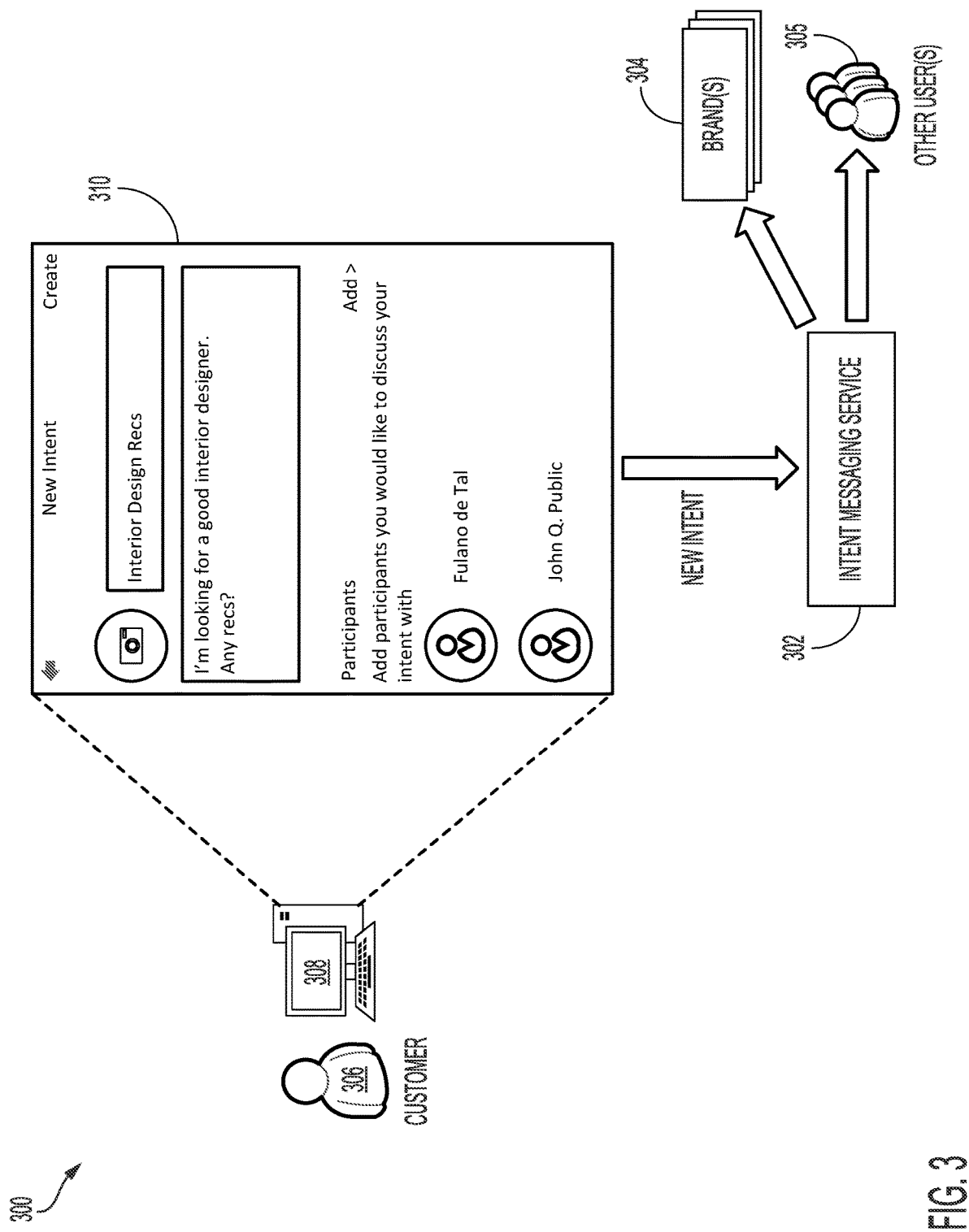
FIG. 3 shows an illustrative example of an environment in which a customer, via a user interface, generates an intent to solicit a response from brands and other users of an intent messaging service in accordance with at least one embodiment.

FIG. 3 shows an illustrative example of an environment 300 in which a customer 306, via a user interface 310, generates an intent to solicit a response from brands 304 and other users 305 of an intent messaging service 302 in accordance with at least one embodiment. In the environment 300, a customer 306, via an intent messaging application operating on a computing device 308, generates a new intent that can be submitted to an intent messaging service 302 to solicit one or more responses from brands 304 and other users 305 associated with the intent messaging service 302. For instance, using the intent messaging application via the user interface 310, the customer 306 may define a request or intent for which the customer 306 is seeking responses from brands 304 and other users 305 associated with the intent messaging application 302.

As illustrated in FIG. 3, the customer 306, via the user interface 310, may be presented with an option to provide a title for its request or intent, as well as an option to define the request or intent. For example, the customer 306 may provide, as a title to its request or intent, "Interior Design Recs" for a request or intent that serves as a solicitation from the customer 306 for recommendations for interior designers that may be of service to the customer 306. Further, via the user interface 310, the customer 306 may define the parameters of the request or intent (e.g., "I'm looking for a good interior designer"). This information may be utilized by the intent messaging service 302 to extract the intent of the customer 306 and identify one or more brands 304 and other users 305 from which to solicit responses to the intent submitted by the customer 306.

In an embodiment, the intent messaging service 302 can utilize natural language processing or other artificial intelligence to query the customer 306 for additional information that can be used to supplement the intent and allow for a tailored identification of brands 304 and other users 305 that may be likely to provide relevant responses to the intent. For instance, the intent messaging service 302 may query the customer 306 to identify a location of the customer, whether other users can help the customer with its intent, what the timeframe is for resolution of the intent, and the like. Responses provided by the customer 306 to the intent messaging service 302 may be used to further narrow selection of brands 304 and other users 305 from which responses to the intent may be solicited.

In an embodiment, the customer 306 can be presented, via the user interface 310 by the intent messaging application, with a listing of contacts or other participants that may be added to the conversation with regard to the submitted intent. For instance, the intent messaging application may obtain a listing of contacts from the customer's computing device 308, which may be presented via the user interface 310. Alternatively, the intent messaging application may obtain, from the intent messaging service 302, a listing of contacts associated with the customer 306 that also utilize the intent messaging service 302. This listing of contacts from the intent messaging service 302 may include users that the customer 306 has designated as "friends" or otherwise able to directly communicate with the customer 306 via the intent messaging service 302.

In an embodiment, via the user interface 310, the intent messaging service 302 can further provide recommendations for brands 304 and/or other users 305 from which the customer 306 can solicit a response to the submitted intent. For instance, based on an evaluation of the intent by the intent messaging service 302, the intent messaging service 302 may recommend one or more brands 304 or other users 305 that may be likely to provide relevant responses to the submitted intent. The intent messaging service 302 may present these one or more brands 304 or other users 305 to allow the customer 306 to select which brands 304 or other users 305 are to receive the intent in order to solicit a response to the intent. Based on the customer's selection, the intent messaging service 302 may solicit a response to the intent from the selected brands and/or other users.

Figure 4:
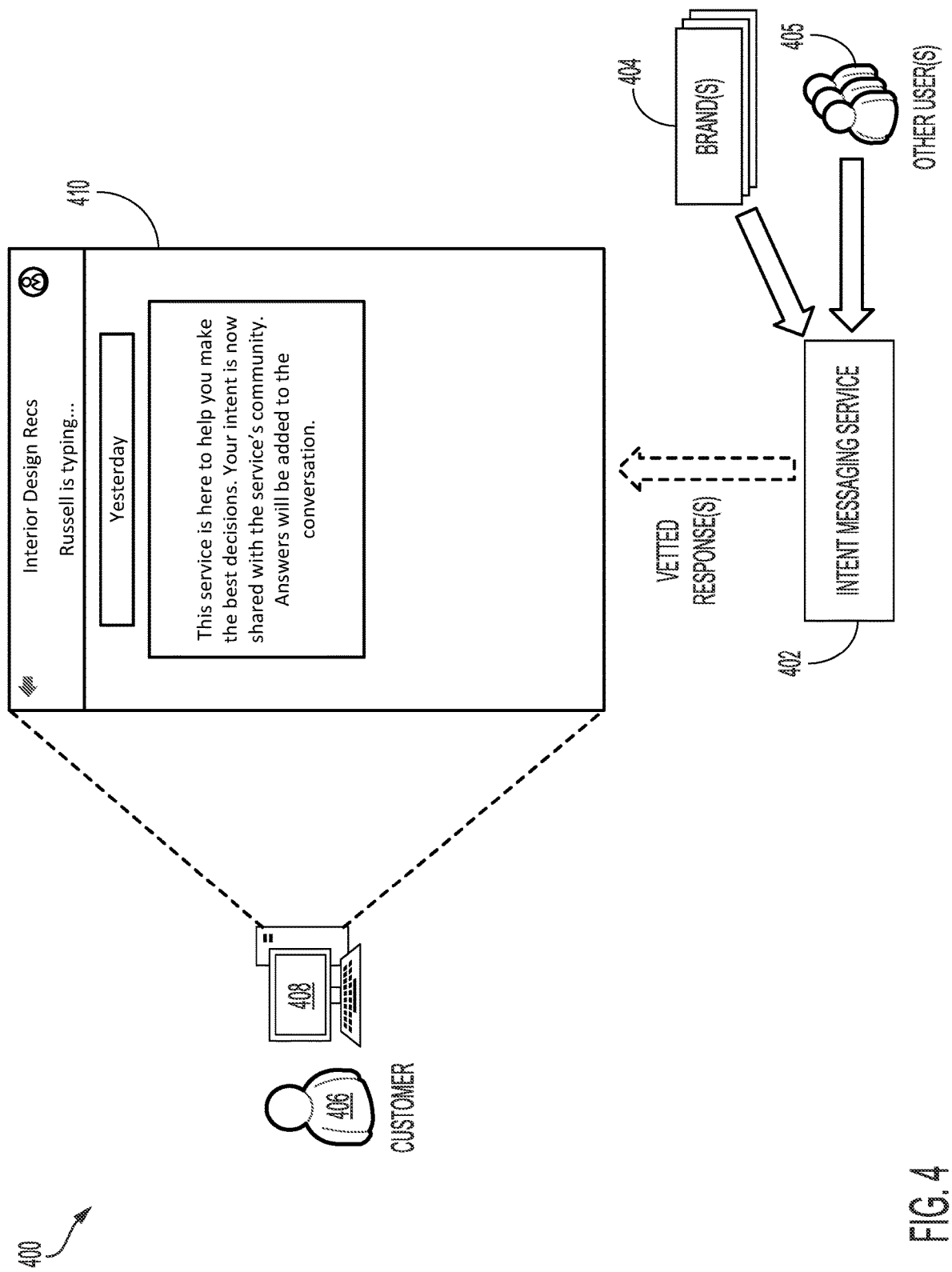
FIG. 4 shows an illustrative example of an environment in which a customer is provided with a status with regard to an intent submitted by the customer via a user interface in accordance with at least one embodiment.

FIG. 4 shows an illustrative example of an environment 400 in which a customer 406 is provided with a status with regard to an intent submitted by the customer 406 via a user interface 410 in accordance with at least one embodiment. In the environment 400, in response to submitting a new intent to the intent messaging service 402 to solicit responses to the intent from one or more brands 404 and other users 405, the intent messaging service 402 may evaluate the intent and profiles of different brands and users associated with the intent messaging service 402 to identify a subset of brands 404 and other users 405 that may be solicited to provide a response to the intent. In an embodiment, the intent messaging service 402, using a machine learning model implemented by an intent matching system, identifies brands 404 and other users 405 that are likely to provide relevant responses to the intent submitted by the customer 406. The machine learning model may utilize a brand database and user database maintained by the intent matching system, as well as the customer's intent, as input to a machine learning model to identify the brands and/or users that are likely to provide relevant responses to the intent. The brand database and user database may include profiles of each of the brands and users, respectively, which may be associated with the intent messaging service 402. Each profile may indicate a user's or brand's experience responding to particular intents or categories of intents, as well as the user's or brand's interest in the underlying topic or classification of the intent. Further, each profile may indicate feedback with regard to a user's or brand's response to previously provided intents. This feedback may specify whether a response provided in response to an intent was relevant, useful, or otherwise appreciated by the corresponding customer.

In response to obtaining an intent from the customer 406, the intent messaging service 402 may update the user interface 410 to provide a new conversation window for the provided intent. The name or title of the conversation window presented via the user interface 410 may correspond to the name or title of the request submitted by the customer 406 to the intent messaging service 402 via the user interface 410. Further, via the user interface 410 and within the conversation window for the intent, the intent messaging service 402 may provide a status with regard to the processing of the customer's provided intent. For instance, as illustrated in FIG. 4, the intent messaging service 402 may indicate that the intent has been shared with the intent messaging service's community (e.g., brands 404 and other users 405 solicited to provide a response to the intent). Further, the intent messaging service 402 may indicate, via the user interface 410, that any vetted responses from the brands 404 and/or other users 405 may be presented to the customer 406 within the conversation window related to the intent submitted by the customer 406.

In an embodiment, the customer 406 can introduce one or more other contacts to the conversation window in order to enable communication between the customer 406 and these one or more contacts within the conversation window. For instance, the customer 406 may select, from a listing of available contacts, one or more contacts that the customer 406 may invite to partake in the conversation tied to the submitted intent. This listing of available contacts may be maintained by the intent messaging service 402 and may be provided to the customer 406 via the intent messaging application operating on computing device 408. Alternatively, the listing of available contacts may be maintained on the computing device 408. If the customer 406 selects one or more contacts from this listing, the intent messaging service 402 may obtain contact information for each of these one or more contacts and transmit a notification to each of these one or more contacts to invite these one or more contacts to partake in the conversation with the customer 406 with regard to the intent. If the listing of contacts is maintained on the computing device 408, the intent messaging application may obtain the contact information from the computing device 408 and provide this contact information to the intent messaging service 402 to provide a notification to these contacts with regard to the conversation. In an embodiment, the notification can include a Uniform Resource Identifier (URI) or other network address of the conversation. A contact may access the conversation by utilizing the URI or other network address provided by the intent messaging service 402.

As responses to the intent are obtained from the brands 404 and other users 405 to which the intent was provided to solicit a response, the intent messaging service 402 may determine these responses to determine whether the responses are relevant and responsive to the intent submitted by the customer 406. In an embodiment, the intent messaging service 402 utilizes a classification algorithm or other machine learning model to classify responses to an intent as being either relevant to the intent or irrelevant to the intent. Responses classified as being irrelevant to the intent are discarded by the intent messaging service 402 and may not be presented to the customer 406 via the user interface 410. However, any responses classified as being relevant to the intent submitted by the customer 406 may be presented to the customer 406 via the user interface 410. For instance, the intent messaging service 402 may transmit the relevant (e.g., vetted) responses to the intent messaging application on the customer's computing device 408 to cause the intent messaging application to update the conversation window associated with the intent to present the obtained responses. The customer 406 may select any of the obtained responses to the intent to initiate a conversation with the brand 404 or other user 405 that supplied the selected response. This conversation may be presented within the conversation window, through which the customer 406 may communicate with the brand 404 or other user 405.

Figure 5:
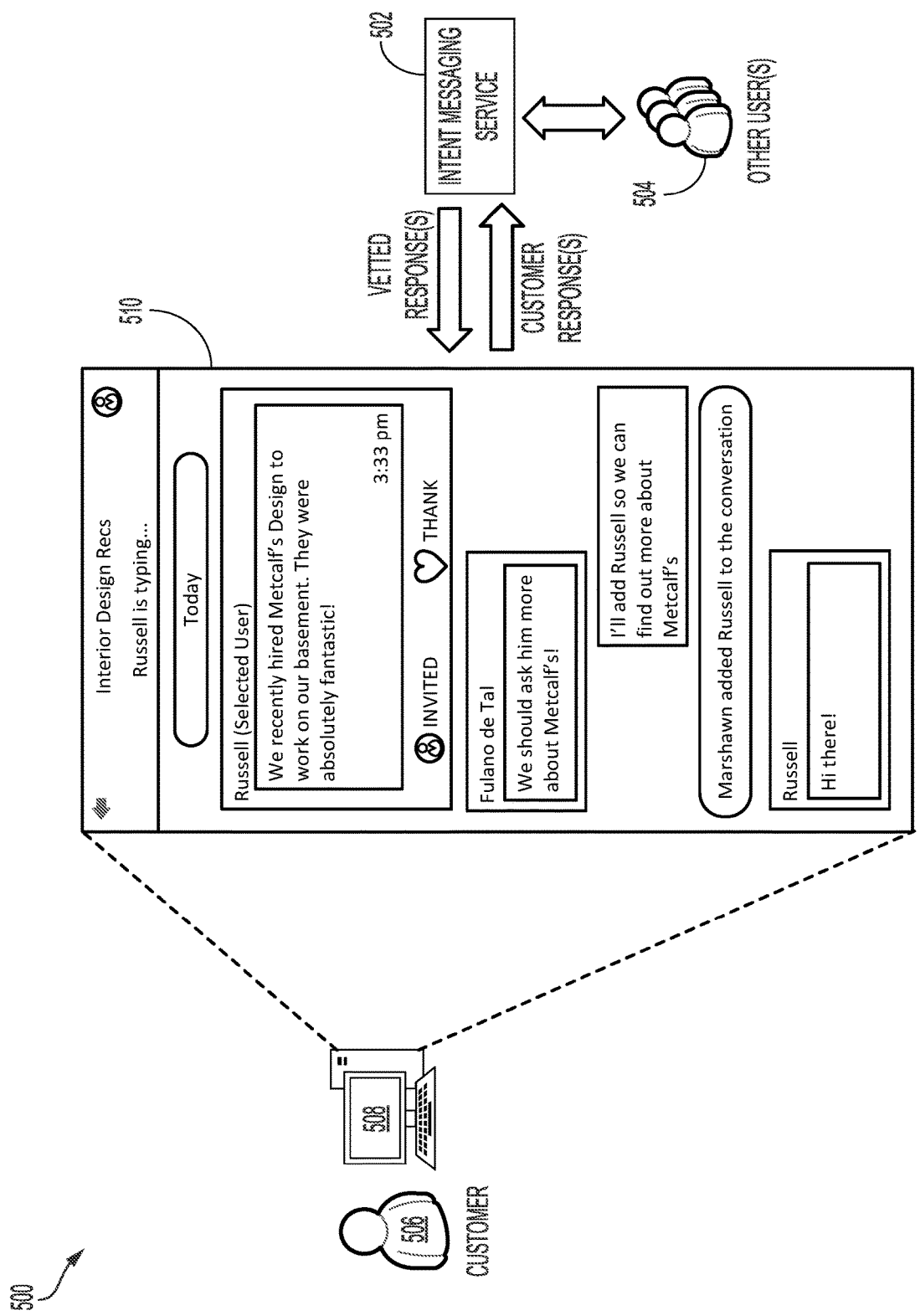
FIG. 5 shows an illustrative example of an environment in which a customer, via a user interface, introduces another user or brand to an existing conversation based on a response to an intent of the customer in accordance with at least one embodiment.

FIG. 5 shows an illustrative example of an environment 500 in which a customer 506, via a user interface 510, introduces another user 504 or brand to an existing conversation based on a response to an intent of the customer 506 in accordance with at least one embodiment. In the environment 500, a customer 506 is presented, via a user interface 510 of an intent messaging application operating on a computing device 508 of the customer 506, with a vetted response from another user 504 to an intent submitted by the customer 506 to the intent messaging service 502. As noted above, an intent may be provided to select brands and other users based on one or more factors. For instance, another user 504 may be presented with an intent of the customer 506 as a result of the other user 504 having experience responding to similar intents and/or submitting similar intents to the intent messaging service 502. Further, the other user 504 may be presented with the intent as a result of the other user's interest in the topic of the intent submitted to the intent messaging service 502. In an embodiment, the other user 504 is presented with the intent as a result of a determination generated using a machine learning model that may utilize the intent, as well as brand and user profiles from respective databases, as input to generate an output that includes identifiers of the selected brands and users to which the intent is to be provided.

Responses to an intent from brands and other users 504 may be evaluated by the intent messaging service 502 to determine whether these responses are relevant to a particular intent. For instance, the intent messaging service 502 may utilize a classification algorithm or other machine learning model to evaluate responses to an intent to classify each response as either being relevant to the intent or irrelevant to the intent. Any responses classified as being irrelevant to the intent may be discarded by the intent messaging service 502. Responses that are classified as being relevant to the intent may be presented to the customer 506 via the user interface 510. Further, each response may be provided with options for the customer 506 to invite the other user 504 to a conversation with regard to the intent, to thank the other user 504 for their response, to ignore the response from the other user 504, to ignore future responses from the other user 504 (e.g., block the other user 504), and the like.

In an embodiment, the customer 506, via the user interface 510, can converse with one or more of its contacts while awaiting responses to an intent submitted by the customer 506 to the intent messaging service 502. For instance, the intent messaging application may present the customer 506 with a user interface 510 that is specific to the intent submitted by the customer 506 to the intent messaging service 502. Through this user interface 510, the customer 506 may receive relevant responses from other users 504 and brands to which the intent is provided by the intent messaging service 504. Further, through this user interface 510, the customer 506 may invite any known contacts to a conversation with regard to the intent. For instance, using the intent messaging application provided by the intent messaging service 502, the customer 506 may select one or more contacts to add to the conversation related to the intent submitted by the customer 506 to the intent messaging service 502. These one or more contacts may also be customers of the intent messaging service 502 and may thus also utilize the intent messaging application to access the intent messaging service 502 and interact with the customer 506, other users 504, and brands.

In an embodiment, the customer 506 can additionally, or alternatively, select contacts that are unaffiliated with the intent messaging service 502. For example, the customer 506 may select one or more contacts from a set of contacts maintained on the computing device 508. The intent messaging application may utilize contact information of the selected contacts to transmit a notification to these selected contacts indicating that these contacts have been invited to engage in a conversation with the customer 506 with regard to the particular intent. The notification may include a Uniform Resource Identifier (URI) or other link to the intent messaging service 502, from which these contacts may obtain the intent messaging application needed to access the conversation. While awaiting responses from other users 504 and brands, the customer 506 may converse with any invited contacts via the user interface 510. These contacts may also utilize an intent messaging application provided by the intent messaging service 502 on their respective computing devices or through other messaging applications that may interact with the intent messaging service 502 to allow for communication between the customer 506 and its contacts.

When a vetted response to an intent is presented to the customer 506 via the user interface 510, any other participants engaged in the conversation with the customer 506 and associated with the intent may also view the response. This may allow these other participants to provide their own feedback with regard to the vetted response. For example, as illustrated in FIG. 5, a participant in the conversation between the customer 506 and any selected contacts for a particular intent may be presented with the vetted response provided by another user 504 to the intent messaging service 502 for presentation to the customer 506 via the user interface 510. The other participants in the conversation with the customer 506 for the particular intent may provide comments or suggestions to the customer 506 with regard to obtained response from the other user 504.

The customer 506, via the user interface 510, may introduce the other user 504 or brand that provided the intent response to the customer 506 into the existing conversation related to the intent. For instance, as illustrated in FIG. 5, the response from another user 504 may be provided with options for the customer 506 to invite the other user 504 to the existing conversation between the customer 506 and other contacts with regard to the intent, to thank the other user 504 for their response, to ignore the response from the other user 504, to ignore future responses from the other user 504 (e.g., block the other user 504), and the like. If the customer 506 invites the other user 504 to partake in the conversation with regard to the intent, the intent messaging application operating on the computing device 508 may transmit a request to the intent messaging service 502 to allow the other user 504 to interact with the customer 506 and any other contacts participating in the conversation related to the intent. In response to the request, the intent messaging service 502 may transmit additional customer information to the other user 504. This additional customer information may include the customer's name, address, contact information, pictures, and the like. Further, the intent messaging service 502 may allow the other user 504 to interact with the customer 506 and any other participant in the conversation regarding the intent.

Figure 6:
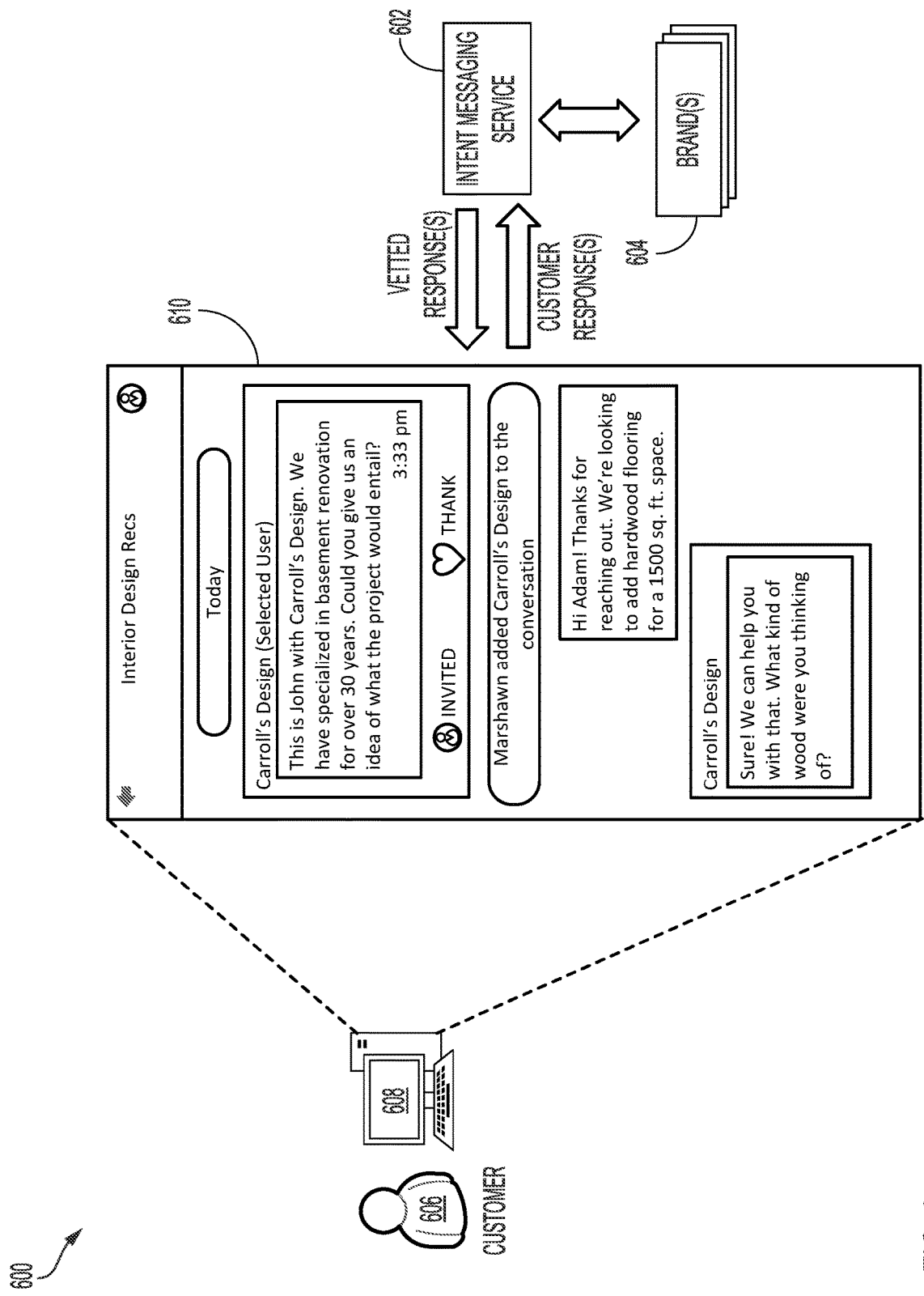
FIG. 6 shows an illustrative example of an environment in which a customer, via a user interface, initiates a communications channel with a brand to converse with the brand with regard to an intent in accordance with at least one embodiment.

FIG. 6 shows an illustrative example of an environment 600 in which a customer 606, via a user interface 610, initiates a communications channel with a brand 604 to converse with the brand 604 with regard to an intent in accordance with at least one embodiment. In the environment 600, the intent messaging service 602 may provide, via a user interface 610 of an intent messaging application operating on a customer's computing device 608, a vetted response to an intent submitted by the customer 606 to the intent messaging service 602. The vetted response, as illustrated in FIG. 6, may include the name of the brand 604 that submitted the response to the intent. As noted above, the intent messaging service 602 may evaluate responses from brands 604 and other users to determine whether these responses are relevant to a particular intent. For instance, the intent messaging service 602 may utilize a classification algorithm or other machine learning model to evaluate responses to an intent to classify each response as either being relevant to the intent or irrelevant to the intent. Any responses classified as being irrelevant to the intent may be discarded by the intent messaging service 602. Responses that are classified as being relevant to the intent may be presented to the customer 606 via the user interface 610. Further, each response may be provided with options for the customer 606 to invite the brand 604 to a conversation with regard to the intent, to thank the brand 604 for their response, to ignore the response from the brand 604, to ignore future responses from the brand 604 (e.g., block the brand 604), and the like.

Through the user interface 610, the customer 606 may invite a brand 604 to partake in a conversation with regard to the response provided by the brand 604 to the intent submitted by the customer 606 to the intent messaging service 602. For instance, through the user interface 610, the customer 606 may select an option to invite a brand 604 to engage in a conversation with the customer 606. If the customer 606 selects this option, the intent messaging application on the customer's computing device 608 may transmit a request to the intent messaging service 602 to initiate a communications channel between the customer 606 and the brand 604. In response to the request, the intent messaging service 602 may transmit additional customer information to the brand 604. This additional customer information may include the customer's name, address, contact information, pictures, and the like. Further, the intent messaging service 602 may allow the brand 604 to interact with the customer 606 via the communications channel established between the customer 606 and the brand 604.

Once the communications channel between the customer 606 and the brand 604 has been established, the customer 606 may transmit messages to the brand 604 via the user interface 610. For instance, as illustrated in FIG. 6, the customer 606 may respond to the vetted response of the brand 604 to greet the brand 604 and provide additional details with regard to its intent and that may be responsive to the vetted response from the brand 604. This response from the customer 606 may be transmitted to the brand 604 over the communications channel established by the intent messaging service 602. This may result in the response being presented to the brand 604 via a user interface of an intent messaging application utilized by an agent or other user associated with the brand 604. The brand 604 may provide additional responses that may be presented to the customer 606 via the user interface 610. Thus, through the intent messaging service 602, the customer 606 and the brand 604 may communicate with regard to a particular intent of the customer 606 to potentially identify a resolution to the intent.

Figure 7:
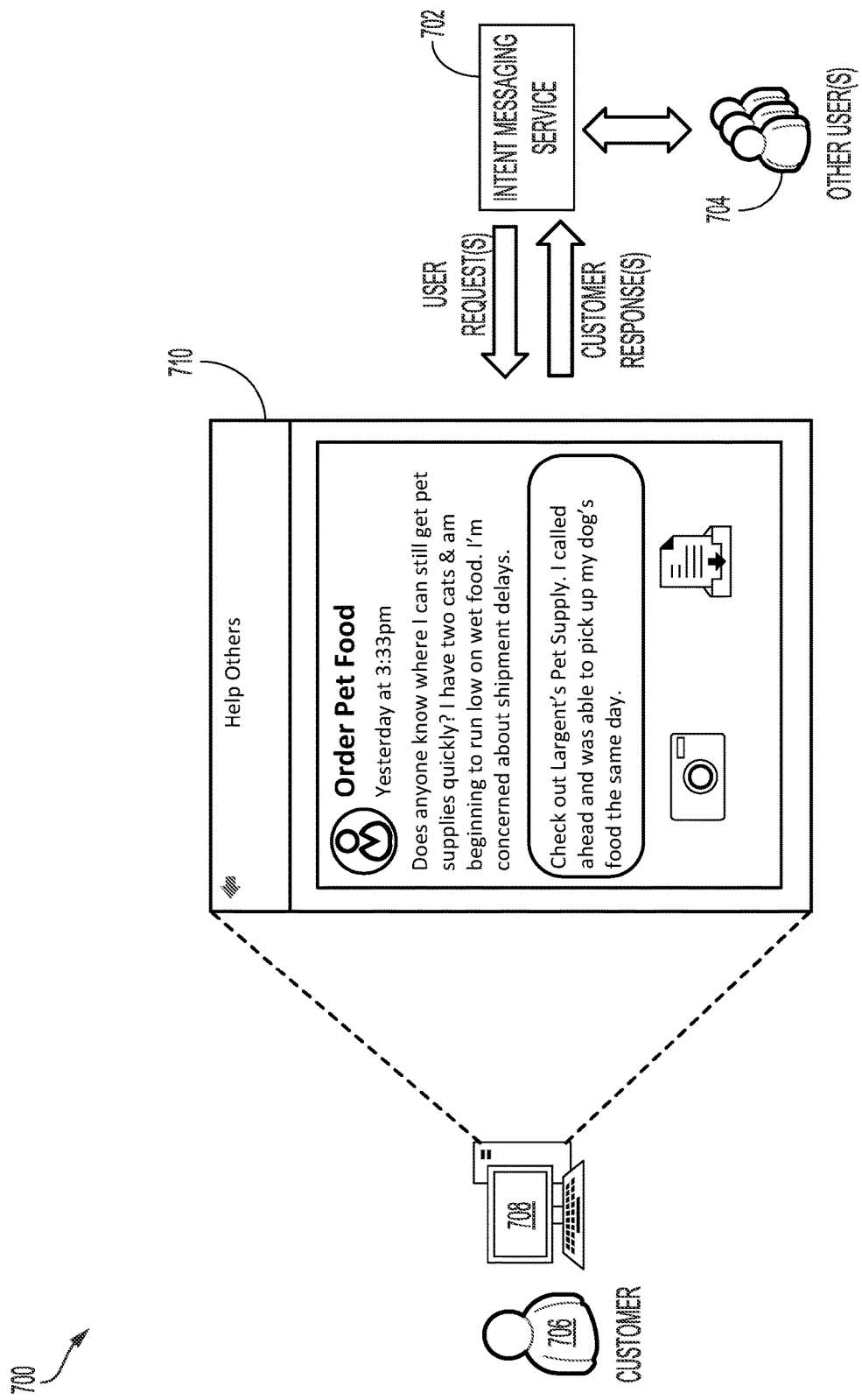
FIG. 7 shows an illustrative example of an environment in which a customer, via a user interface, provides a response to an intent of another customer in accordance with at least one embodiment.

FIG. 7 shows an illustrative example of an environment 700 in which a customer 706, via a user interface 710, provides a response to an intent of another customer in accordance with at least one embodiment. In the environment 700, the intent messaging service 702 may select the customer 706 to solicit a response to an intent submitted by another user 704 of the intent messaging service 702. As noted above, in response to obtaining a request from a user, the intent messaging service 702 may extract an intent from the request and identify one or more brands and other users that are likely to have relevant experience with regard to the intent and that are likely to provide a relevant response to the intent. For instance, the intent messaging service 702, via an intent matching system, may utilize a machine learning model to identify the one or more brands and other users that are to be provided with the intent in order to solicit responses to the intent that can be presented to the user that submitted the request. The machine learning model may utilize the intent, as well as brand and user profiles from respective databases, as input to generate an output that includes identifiers of the selected brands and users to which the intent is to be provided.

As illustrated in FIG. 7, the customer 706 is selected by the intent messaging service 702 to obtain the intent from another user 704 in order to solicit a response to the intent from the customer 706. The customer 706 may have been selected by the intent messaging service 702 based on one or more factors. For instance, the customer 706 may have prior experience with regard to the particular intent from the other user 704. As an illustrative example, if the other user 704 expresses an intent to identify locations where one can order pet food quickly, the intent messaging service 702 may determine that the customer 706 has had prior experience in obtaining pet food from different brands or locations. This prior experience may have been expressed to the intent messaging service 702 through prior intents submitted by the customer 706 to the intent messaging service 702, through responses provided to other users 704 of the intent messaging service 702, or through other expressions provided by the customer 706 to the intent messaging service 702 (e.g., customer has indicated an interest in pets, customer has interacted with brands related to pets and pet care, etc.).

The intent messaging service 702 may update the user interface 710 of the intent messaging application installed on the customer's computing device 708 to provide the intent of the other user 704. For instance, through the user interface 710, the customer 706 may be presented with a new conversation window that includes the other user's intent. The intent may be presented without any identifying information of the other user 704 that submitted the intent. In some instances, the intent may be provided with other information that may be of use to the customer 706 in providing a response to the intent. For instance, the intent may be presented, via the user interface 710, with geographic location information of the other user 704, a timeframe for addressing the intent, and the like. This additional information may be used by the customer 706 to tailor its response to the intent. For example, if the intent is to identify a location where the other user 704 can obtain pet food quickly, the intent may be provided with a geographic location of the other user 704. The customer 706 may use this additional information to identify a pet food location that is within the vicinity of the specified geographic location. Thus, this additional information may be useful to the customer 706 to allow the customer 706 to prepare a relevant response to the intent.

The customer 706, via the user interface 710, may submit a response to the intent. As illustrated in FIG. 7, the customer 706 has indicated the name of a brand that may be used by the other user 704 to address the intent. Further, the customer 706 may provide other information that may be of use to the other user 704. For example, the customer 706 may indicate its own experience with the specified brand, which may be useful to the other user 704 if it decides to engage the specified brand. Through the user interface 710, the customer 706 may additionally provide digital images, voice recordings, video recordings, or other media in response to the intent and that may be of use to the other user 704.

The intent messaging service 702 may obtain the intent response submitted by the customer 706 via the user interface 710 from the computing device 708. In response to obtaining this intent response from the customer 706, the intent messaging service 702 may evaluate the intent response to determine whether this intent response is relevant to the intent submitted by the other user 704. For instance, the intent messaging service 702 may utilize a classification algorithm or other machine learning model to classify the intent response submitted by the customer 706 as being relevant or irrelevant to the intent. The classification algorithm or other machine learning model may be trained using supervised learning techniques. For instance, a dataset of input intents, known relevant responses, known irrelevant responses, and classifications, can be selected for training of the classification algorithm or other machine learning model. In some examples, the input intents can be obtained from administrators of the intent messaging service, customers of the intent messaging service, or other sources associated with the intent messaging service. In some implementations, known relevant and irrelevant responses used to train the classification algorithm or other machine learning model utilized by the intent processing system include responses generated by the entities that generated the sample intents.

If the intent messaging service 702 determines that the response provided by the customer 706 to the intent is relevant to the intent, the intent messaging service 702 may provide the response to the other user 704. The other user 704 may evaluate the response from the customer 706 and determine whether to further engage the customer 706 in conversation through the intent messaging service 702. If so, the intent messaging service 702 may update the user interface 710 of the customer 706 to supply the customer 706 with identifying information of the other user 704. Further, the intent messaging service 702 may establish a communications channel between the customer 706 and the other user 704 to allow the customer 706 and other user 704 to converse using their respective intent messaging applications.

Figure 8:
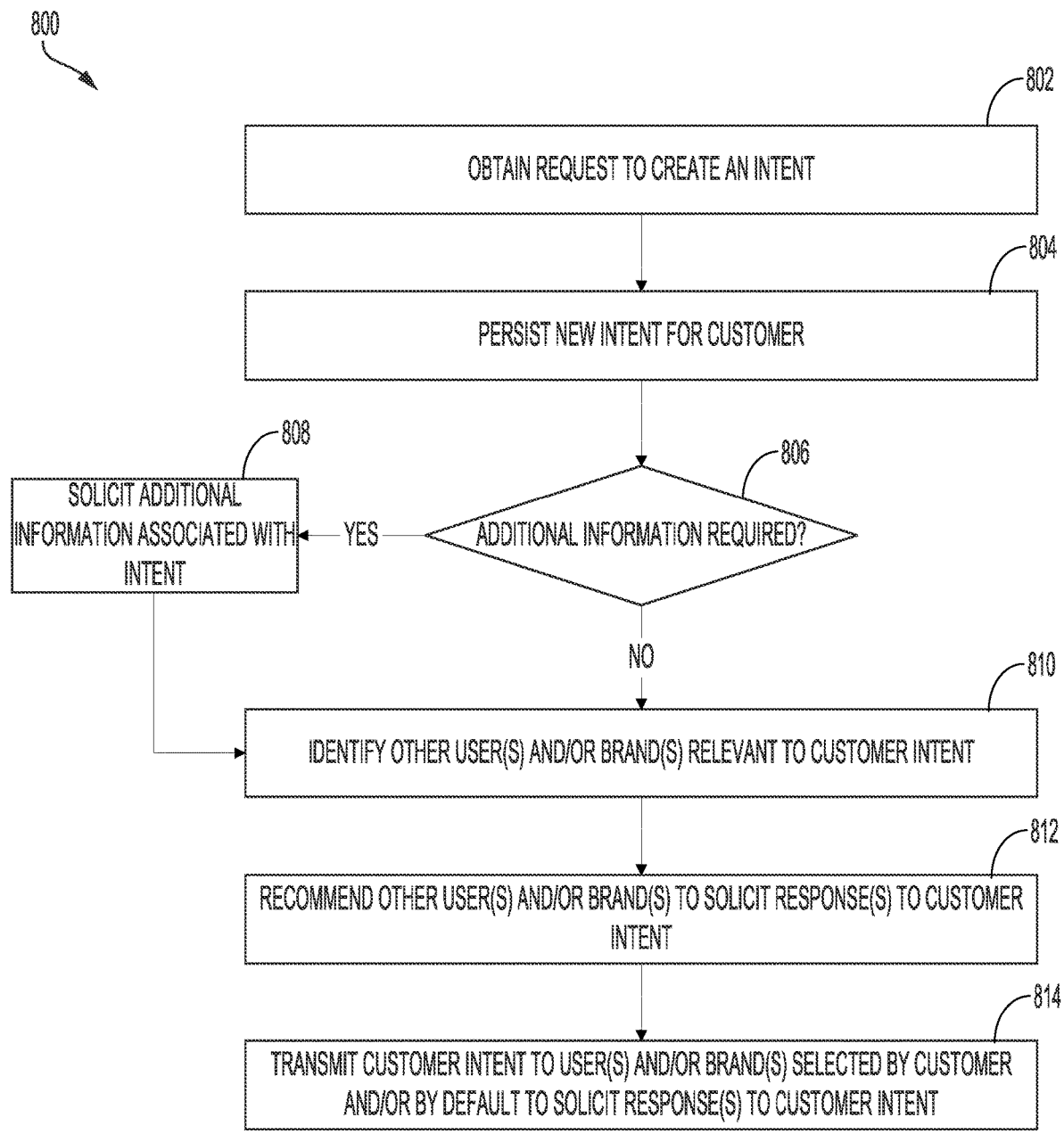
FIG. 8 shows an illustrative example of a process for obtaining an intent and providing the intent to other users and brands in accordance with at least one embodiment.

FIG. 8 shows an illustrative example of a process 800 for obtaining an intent and providing the intent to other users and brands in accordance with at least one embodiment. The process 800 may be performed by the intent messaging service, which may utilize an intent processing system to extract an intent from a request generated by the customer and an intent matching system to identify the one or more brands and other users to which the intent may be provided in order to solicit a response to the intent from these one or more brands and other users. For instance, in response to obtaining a request to solicit responses from a customer via an intent messaging application, the intent messaging service may obtain an intent of the customer and identify brands and other users that may provide responses to the intent. The customer may use these responses to determine which brands and users to communicate with to obtain a resolution to their request.

At step 802, the intent messaging service obtains a request to create an intent. For instance, using an intent messaging application provided by the intent messaging service and installed on to a customer's computing device, the customer may generate a request to solicit one or more responses from different brands or other users within a network of users of the intent messaging service. In the request, the customer may specify a name for the request, as well as provide its request that is to be associated with the provided name. The request may include an intent that may be used to identify brands and other users that may be able to provide relevant responses to the customer's request. Examples of intents can include (for example) topic, sentiment, complexity, and urgency. A topic can include, but is not limited to, a subject, a product, a service, a technical issue, a use question, a complaint, a refund request or a purchase request, etc. An intent can be determined, for example, based on a semantic analysis of a message (e.g., by identifying keywords, sentence structures, repeated words, punctuation characters and/or non-article words); user input (e.g., having selected one or more categories); and/or message-associated statistics (e.g., typing speed and/or response latency).

In response to the request from the customer, the intent messaging service, at step 804, persists a new intent for the customer. For instance, the intent messaging service may extract, from the request, an intent that may be used to identify brands and users that are likely to respond to the request with relevant information or responses that may be of use to the customer. Further, the intent messaging service may associate the intent with a unique identifier that may be used to track the intent and any obtained responses to the intent. This may assist the intent messaging service in identifying responses to the intent from the various brands or users to which the intent is to be provided and with providing relevant responses from these brands or users to the customer.

At step 806, the intent messaging service determines whether additional information is required from the customer that may be used to identify which brands and users may be selected to solicit responses to the intent. For instance, the intent messaging service may evaluate the request and intent to determine whether additional information would be of use in identifying a set of brands and users that can provide relevant responses to the customer's intent. This additional information may include a geographic location of the customer, a timeframe for resolution of the request, any customer preferences for particular brands and/or users, and the like.

If the intent messaging service determines that additional information is required to supplement the request and intent provided by the customer, the intent messaging service, at step 808, can solicit additional information from the customer associated with the intent. For instance, the intent messaging service may utilize natural language processing (NLP) or other artificial intelligence algorithms, via the intent messaging application, to ask the customer various questions related to the customer's intent to solicit this additional information. For instance, if the customer has submitted a request for interior design company recommendations, the intent messaging service may ask the customer where the customer resides, what the timeframe is for completion of a new interior design project, what the budget is for a new interior design project, aspects of the interior design project, and other questions tied to the customer's interior design query. The customer, in response to these additional questions from the intent messaging service, may provide the additional information that may be used to supplement the intent and identify brands and other users that are likely to provide relevant responses to the customer's intent.

At step 810, the intent messaging service identifies brands and/or other users associated with the intent messaging service that are relevant (e.g., likely to provide relevant responses) to the customer's intent. In an embodiment, the intent messaging service, via an intent matching system, utilizes an intent machine learning modeling engine to identify the one or more brands and/or other users that are to be provided the intent in order to solicit responses from these one or more brands and/or other users. The intent machine learning modeling engine may utilize a brand database and user database maintained by the intent matching system, as well as the customer's intent, as input to a machine learning model to identify the brands and/or users that are likely to provide relevant responses to the intent. The brand database and user database may include profiles of each of the brands and users, respectively, which may be associated with the intent messaging service. Each profile may indicate a user's or brand's experience responding to particular intents or categories of intents, as well as the user's or brand's interest in the underlying topic or classification of the intent (e.g., interior design, etc.). Further, each profile may indicate feedback with regard to a user's or brand's response to previously provided intents. This feedback may specify whether a response provided in response to an intent was relevant, useful, or otherwise appreciated by the corresponding customer.

The machine learning model utilized by the intent machine learning modeling engine may be trained using sample intents and sample outputs corresponding to features of brands and other users that may be used to identify the brands and other users to which an intent is to be provided. Further, the machine learning model may be trained using feedback from the different brands and other users receiving an intent. This feedback may be used to determine whether the machine learning model is selecting brands and other users that are capable of responding to an intent with a relevant response or that are otherwise associated with a feature of an intent. For example, if a brand that provides interior design services obtained an intent that is not related to interior design, the brand may provide feedback indicating that the provided intent is not relevant to the brand. This feedback may be used to further train the machine learning model utilized by the intent matching system.

At step 812, based on the output generated by the intent machine learning modeling engine, the intent messaging service recommends other users and/or brands from which to solicit responses to the customer's intent. For instance, the intent messaging service may provide, via the intent messaging application, a listing of the brands and/or other users identified by the intent machine learning modeling engine as being likely to provide relevant responses to the customer's intent. Using the intent messaging application, the customer may select a subset of other users and brands to which its intent is to be provided to solicit responses from.

Based on the customer's selection, the intent messaging service, at step 814, transmits the customer intent to the other users and/or brands selected by the customer. In an embodiment, if the customer does not make a selection of brands and/or users to which its intent is to be provided, the intent messaging service can transmit the customer's intent to the other users and/or brands identified by the intent machine learning modeling engine by default. In some instances, the intent messaging service may select a subset of other users and/or brands by default based on a relevancy threshold. For instance, each brand and other user may be scored based on their likelihood to provide a relevant response to the customer's intent. This score may be calculated by the intent machine learning modeling engine based on a brand's or user's historical interest in the topic of the customer's intent, a brand's or user's historical experience in responding to similar intents, and the like.

Figure 9:
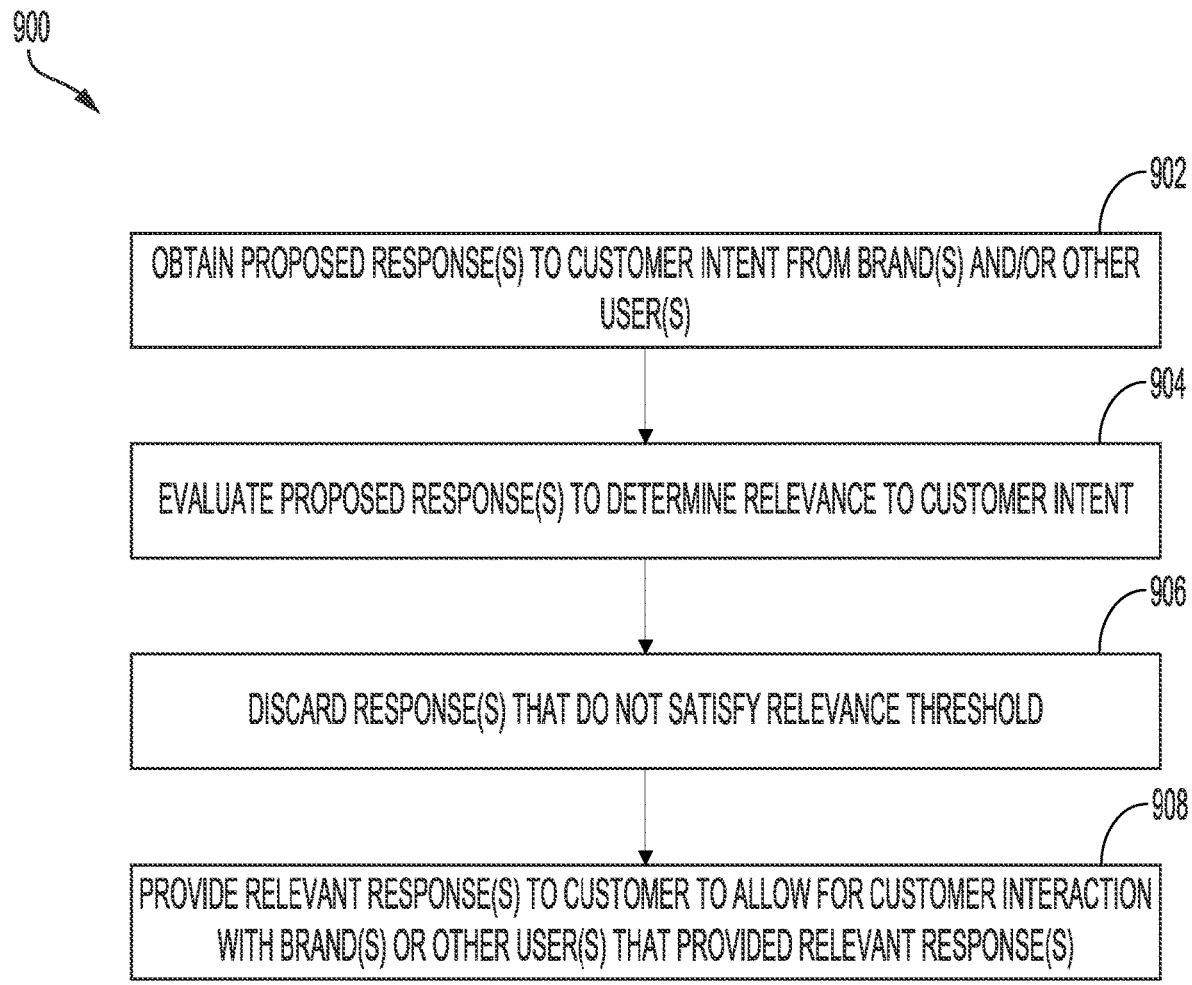
FIG. 9 shows an illustrative example of a process for evaluating proposed responses from brands and other users to identify relevant responses presentable to a customer in response to an intent in accordance with at least one embodiment.

FIG. 9 shows an illustrative example of a process 900 for evaluating proposed responses from brands and other users to identify relevant responses presentable to a customer in response to an intent in accordance with at least one embodiment. The process 900 may be performed by the intent messaging service, which may utilize the intent processing system to evaluate responses to an intent from different brands and users to which the intent was provided in order to determine whether the responses are relevant to the intent and can be provided to the customer. In an embodiment, the intent processing system implements a machine learning model that is used to evaluate the responses from the different brands and users to identify a subset of responses that may be provided to the customer in response to the customer's intent.

At step 902, the intent processing system obtains one or more proposed responses to a customer intent from brands and other users to which a customer intent was provided to solicit a response. As noted above, an intent matching system of the intent matching service may identify one or more brands and other users that may provide relevant responses to a customer intent submitted by a customer of the intent messaging service. For instance, the intent matching system may query a brand database and a user database to identify brands and users, respectively, that may be interested in the intent, have experience responding to similar intents, or may otherwise provide a relevant response to the intent. In an embodiment, the intent matching system utilizes a machine learning model to identify the brands and other users that are likely to provide relevant responses to the customer intent. This machine learning model may be trained using sample intents and sample outputs corresponding to features of brands and other users that may be used to identify the brands and other users to which an intent is to be provided. Further, the machine learning model may be trained using feedback from the different brands and other users receiving an intent. This feedback may be used to determine whether the machine learning model is selecting brands and other users that are capable of responding to an intent with a relevant response or that are otherwise associated with a feature of an intent. For example, if a brand that provides interior design services obtained an intent that is not related to interior design, the brand may provide feedback indicating that the provided intent is not relevant to the brand. This feedback may be used to further train the machine learning model utilized by the intent matching system.

At step 904, the intent processing system evaluates the proposed responses provided by one or more brands and other users to determine the relevance of these proposed responses to the customer intent. For instance, the intent processing system may utilize a classification algorithm or other machine learning model to evaluate a response and classify the response as being either relevant to the intent or irrelevant to the intent. The classification algorithm or other machine learning model may be trained using supervised learning techniques. For instance, a dataset of input intents, known relevant responses, known irrelevant responses, and classifications, can be selected for training of the classification algorithm or other machine learning model. In some examples, the input intents can be obtained from administrators of the intent messaging service, customers of the intent messaging service, or other sources associated with the intent messaging service. In some implementations, known relevant and irrelevant responses used to train the classification algorithm or other machine learning model utilized by the intent processing system include responses generated by the entities that generated the sample intents.

In some examples, the resulting classifications of the known relevant and irrelevant responses to the sample intents are evaluated to determine the loss, or error, that can be used to train the classification algorithm or other machine learning model. For instance, if the classification algorithm or other machine learning model classifies a relevant response to a sample intent as being an irrelevant response or classifies an irrelevant response to a sample intent as being a relevant response, the parameters of the classification algorithm or other machine learning model may be adjusted according to the loss resulting from the misclassification of the responses to the sample intents. These parameters may include weights and biases of the classification algorithm or other machine learning model utilized by the intent processing system.

In an embodiment, the classification algorithm or other machine learning model is also trained to identify characteristics or other features of a response, as well as the characteristics or other features of the intent for which the response was generated. These characteristics or features may be used to classify a response as either being relevant or irrelevant to an intent. For instance, if an intent includes one or more characteristics corresponding to an interior design request, the classification algorithm or other machine learning model may evaluate a response to determine whether the response includes one or more characteristics that also correspond to interior design. Based on a similarity among these characteristics, the classification algorithm or other machine learning model may determine a relevancy score that, if the relevancy score surpasses a relevancy threshold, may correspond to a relevant response. Thus, using the classification algorithm or other machine learning model, the intent processing system may evaluate a response and classify the response as being either relevant or irrelevant to a particular intent.

At step 906, the intent processing system discards any responses from the brands and other users that are not relevant to the customer intent. As noted above, the intent processing system may utilize a classification algorithm or other machine learning model to classify each response obtained from a brand or other user for a particular intent. If the classification algorithm or other machine learning model determines that a response does not satisfy a relevancy threshold, the classification algorithm or other machine learning model may classify the response as being irrelevant to the intent. The intent processing system may, thus, obtain any responses classified as being irrelevant to the customer intent and discard these responses. In an embodiment, if a brand or other user is identified as having provided an irrelevant response, the intent processing system can provide information regarding the brand or other user, as well as the customer intent for which the brand or other user was determined to have provided an irrelevant response, to the intent matching system. The intent matching system may utilize this information to further train its machine learning model utilized to identify brands and other users that may be selected for solicitation of responses to particular intents. This may result in the brand or other user that provided an irrelevant response being less likely to be selected by the intent matching system to provide a response to an intent similar to the customer intent for which the brand or other user provided an irrelevant response.

At step 908, the intent processing system provides the relevant responses obtained from the one or more brands and other users to the customer to allow for customer interaction with these brands and other users via the intent messaging application. For instance, the intent processing system may transmit the relevant responses to the intent messaging application, which may cause the intent messaging application to update a GUI to present the available responses to the customer via the customer's computing device. From this GUI, the customer may determine whether to initiate a conversation with a brand or other user that provided a relevant response. If the customer does not wish to initiate a conversation with a brand or other user that provided a response deemed to be relevant by the intent processing system, the customer may instead transmit a notification to the brand or other user via the intent messaging service thanking the brand or other user for its response. Additionally, or alternatively, the customer may submit feedback with regard to the obtained response. For instance, the customer may indicate whether the provided response was relevant to the intent submitted by the customer. This feedback may be used by the intent processing system to further train the classification algorithm or other machine learning model utilized to identify relevant responses to given intents. If the customer opts to initiate a conversation with a brand or other user, the intent messaging service may open a communications channel between the customer and the particular brand or other user. This allows the brand or other user to interact with the customer over the communications channel.

Figure 10:
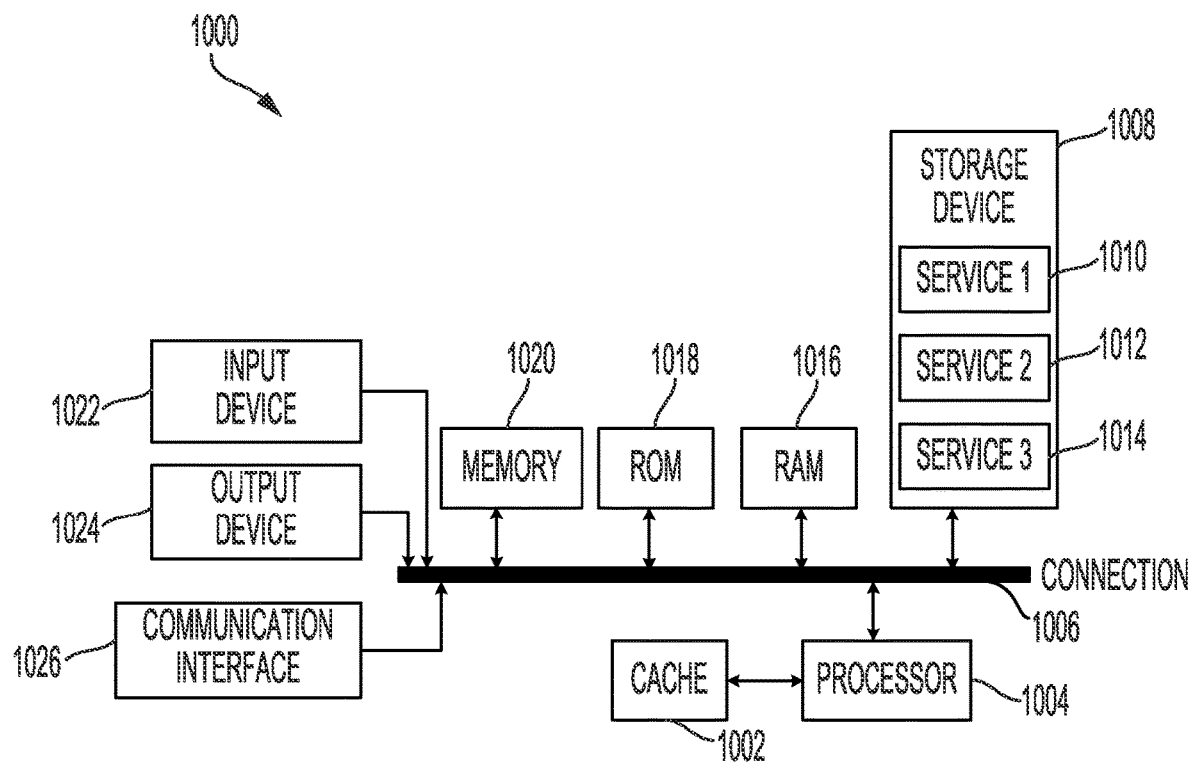
FIG. 10 shows an illustrative example of an environment in which various embodiments can be implemented.

FIG. 10 illustrates a computing system architecture 1000 including various components in electrical communication with each other using a connection 1006, such as a bus, in accordance with some implementations. Example system architecture 1000 includes a processing unit (CPU or processor) 1004 and a system connection 1006 that couples various system components including the system memory 1020, such as ROM 1018 and RAM 1016, to the processor 1004. The system architecture 1000 can include a cache 1002 of high-speed memory connected directly with, in close proximity to, or integrated as part of the processor 1004. The system architecture 1000 can copy data from the memory 1020 and/or the storage device 1008 to the cache 1002 for quick access by the processor 1004. In this way, the cache can provide a performance boost that avoids processor 1004 delays while waiting for data. These and other modules can control or be configured to control the processor 1004 to perform various actions.

Other system memory 1020 may be available for use as well. The memory 1020 can include multiple different types of memory with different performance characteristics. The processor 1004 can include any general purpose processor and a hardware or software service, such as service 1 1010, service 2 1012, and service 3 1014 stored in storage device 1008, configured to control the processor 1004 as well as a special-purpose processor where software instructions are incorporated into the actual processor design. The processor 1004 may be a completely self-contained computing system, containing multiple cores or processors, a bus, memory controller, cache, etc. A multi-core processor may be symmetric or asymmetric.

To enable user interaction with the computing system architecture 1000, an input device 1022 can represent any number of input mechanisms, such as a microphone for speech, a touch-sensitive screen for gesture or graphical input, keyboard, mouse, motion input, speech and so forth. An output device 1024 can also be one or more of a number of output mechanisms known to those of skill in the art. In some instances, multimodal systems can enable a user to provide multiple types of input to communicate with the computing system architecture 1000. The communications interface 1026 can generally govern and manage the user input and system output. There is no restriction on operating on any particular hardware arrangement and therefore the basic features here may easily be substituted for improved hardware or firmware arrangements as they are developed.

Storage device 1008 is a non-volatile memory and can be a hard disk or other types of computer readable media which can store data that are accessible by a computer, such as magnetic cassettes, flash memory cards, solid state memory devices, digital versatile disks, cartridges, RAMs 1016, ROM 1018, and hybrids thereof.

The storage device 1008 can include services 1010, 1012, 1014 for controlling the processor 1004. Other hardware or software modules are contemplated. The storage device 1008 can be connected to the system connection 1006. In one aspect, a hardware module that performs a particular function can include the software component stored in a computer-readable medium in connection with the necessary hardware components, such as the processor 1004, connection 1006, output device 1024, and so forth, to carry out the function.

The disclosed methods can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDN0 modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method comprising:
    obtaining an intent, wherein the intent corresponds to a request that is to be addressed, and wherein the intent is associated with a customer;
    identifying one or more users to which to provide the intent, wherein the one or more users are identified based on a set of characteristics of the intent;
    providing the intent, wherein the intent is provided to the one or more users to solicit responses to the intent;
    obtaining a set of responses to the intent;
    evaluating the set of responses to identify relevant responses to the intent, wherein irrelevant responses from the set of responses are discarded; and
    providing the relevant responses to cause the relevant responses to be presented to the customer in response to the intent.

2. The computer-implemented method of claim 1, further comprising:
    receiving a request to initiate a communications channel with a particular user, wherein the request to initiate the communications channel is associated with the intent and a response of the particular user to the intent; and
    establishing the communications channel to allow the particular user to transmit communications responsive to the intent over the communications channel.

3. The computer-implemented method of claim 1, wherein the set of responses are evaluated using a classification model, and wherein the classification model is updated using sample intents, known relevant responses to the sample intents, and known irrelevant responses to the sample intents.

4. The computer-implemented method of claim 1, wherein the one or more users are identified using a machine learning model, and wherein the machine learning model is updated using sample intents and sample outputs corresponding to features of the one or more users.

5. The computer-implemented method of claim 1, further comprising:
    transmitting instructions to an application to cause the application to prohibit creation of new responses to the intent, wherein the instructions are transmitted in response to obtaining the set of responses.

6. The computer-implemented method of claim 1, wherein the intent is extracted from the request based on a semantic analysis of the request.

7. The computer-implemented method of claim 1, wherein the set of characteristics of the intent are obtained in response to a query for additional information associated with the intent.

8. The computer-implemented method of claim 1, further comprising:
    utilizing natural language processing to solicit information associated with the intent, wherein the information associated with the intent is used to extract the intent from the request.

9. A system, comprising:
    one or more processors; and
    memory storing thereon instructions that, as a result of being executed by the one or more processors, cause the system to:
        obtain an intent, wherein the intent corresponds to a request that is to be addressed, and wherein the intent is associated with a customer;
        identify one or more users to which to provide the intent, wherein the one or more users are identified based on a set of characteristics of the intent;
        provide the intent, wherein the intent is provided to the one or more users to solicit responses to the intent;
        obtain a set of responses to the intent;
        evaluate the set of responses to identify relevant responses to the intent, wherein irrelevant responses from the set of responses are discarded; and
        provide the relevant responses to cause the relevant responses to be presented to the customer in response to the intent.

10. The system of claim 9, wherein the instructions, as a result of being executed by the one or more processors, further cause the system to:
    obtain a request to establish a communications channel between a first computing system of the customer and a second computing system of a particular user, wherein the request to establish the communications channel is obtained in response to a determination that a response from the particular user satisfies the intent; and
    establish the communications channel in response to the request to establish the communications channel.

11. The system of claim 9, wherein the relevant responses are identified using a classification model, and wherein the classification model is generated using sample intents, known relevant responses to the sample intents, and known irrelevant responses to the sample intents.

12. The system of claim 9, wherein the one or more users are identified using a machine learning model, and wherein the machine learning model is generated using sample intents and sample outputs corresponding to features of the one or more users.

13. The system of claim 9, wherein the instructions, as a result of being executed by the one or more processors, further cause the system to:
   transmit particular instructions to an application to cause the application to prohibit further responses to the intent from being generated, and wherein the particular instructions are transmitted in response to obtaining the set of responses.

14. The system of claim 9, wherein the instructions, as a result of being executed by the one or more processors, further cause the system to:
   perform a semantic analysis of the request to extract the intent from the request.

15. The system of claim 9, wherein the set of characteristics of the intent are obtained in response to a query for additional information associated with the intent.

16. The system of claim 9, wherein the instructions, as a result of being executed by the one or more processors, further cause the system to:
   utilize natural language processing to solicit information associated with the intent, wherein the information associated with the intent is used to extract the intent from the request.

17. A non-transitory, computer-readable storage medium storing thereon executable instructions that, as a result of being executed by one or more processors of a computer system, cause the computer system to:
   obtain an intent, wherein the intent corresponds to a request that is to be addressed, and wherein the intent is associated with a customer;
   identify one or more users to which to provide the intent, wherein the one or more users are identified based on a set of characteristics of the intent;
   provide the intent, wherein the intent is provided to the one or more users to solicit responses to the intent;
   obtain a set of responses to the intent;
   evaluate the set of responses to identify relevant responses to the intent, wherein irrelevant responses from the set of responses are discarded; and
   provide the relevant responses to cause the relevant responses to be presented to the customer in response to the intent.

18. The non-transitory, computer-readable medium of claim 17, wherein the executable instructions, as a result of being executed by the one or more processors, further cause the computer system to:
   obtain a request to establish a communications channel between a first computing device of the customer and a second computing device of a particular user that provided a relevant response; and
   establish the communications channel between the first computing device of the customer and the second computing device of the particular user to cause interactions between the customer and the particular user over the communications channel with regard to the intent.

19. The non-transitory, computer-readable storage medium of claim 17, wherein the executable instructions, as a result of being executed by the one or more processors, further cause the computer system to:
   use a classification model to evaluate the set of responses, wherein the classification model is updated using sample intents, known relevant responses to the sample intents, and known irrelevant responses to the sample intents.

20. The non-transitory, computer-readable storage medium of claim 17, wherein the one or more users are identified using a machine learning model, and wherein the machine learning model is generated using sample intents and sample outputs corresponding to features of the one or more users.

21. The non-transitory, computer-readable storage medium of claim 17, wherein the executable instructions, as a result of being executed by the one or more processors, further cause the computer system to:
   transmit particular instructions to an application to cause the application to prohibit creation of new responses to the intent, wherein the particular instructions are transmitted in response to obtaining the set of responses.

22. The non-transitory, computer-readable storage medium of claim 17, wherein the executable instructions, as a result of being executed by the one or more processors, further cause the computer system to:
   perform a semantic analysis of the request to obtain the intent.

23. The non-transitory, computer-readable storage medium of claim 17, wherein the set of characteristics of the intent are obtained in response to a query for additional information associated with the intent.

24. The non-transitory, computer-readable storage medium of claim 17, wherein the executable instructions, as a result of being executed by the one or more processors, further cause the computer system to:
   utilize natural language processing to solicit information associated with the intent, wherein the information associated with the intent is used to extract the intent from the request.

* * * * *